(12) United States Patent
Asai

(10) Patent No.: US 11,789,677 B2
(45) Date of Patent: Oct. 17, 2023

(54) NON-TRANSITORY COMPUTER-READABLE STORAGE MEDIUM STORING INSTRUCTIONS FOR INFORMATION PROCESSING DEVICE, INFORMATION PROCESSING DEVICE, AND METHOD FOR CONTROLLING INFORMATION PROCESSING DEVICE

(71) Applicant: Brother Kogyo Kabushiki Kaisha, Nagoya (JP)

(72) Inventor: Norihiko Asai, Tajimi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 439 days.

(21) Appl. No.: 14/303,065

(22) Filed: Jun. 12, 2014

(65) Prior Publication Data
US 2014/0370819 A1 Dec. 18, 2014

(30) Foreign Application Priority Data
Jun. 18, 2013 (JP) ................................. 2013-127802

(51) Int. Cl.
*G06F 3/12* (2006.01)
(52) U.S. Cl.
CPC .......... *G06F 3/1236* (2013.01); *G06F 3/1226* (2013.01); *G06F 3/1292* (2013.01); *G06F 3/126* (2013.01); *Y02D 10/00* (2018.01)
(58) Field of Classification Search
CPC ...... G06F 3/1236; G06F 3/126; G06F 3/1204; G06F 3/1205; G06F 3/1226;
(Continued)

(56) References Cited

U.S. PATENT DOCUMENTS 7,804,608 B2 9/2010 Shirai et al.
7,890,667 B2 * 2/2011 Wakazono ............. H04L 41/22
358/1.18
(Continued)

FOREIGN PATENT DOCUMENTS

JP 2005-044080 A 2/2005
JP 2005-149094 A 6/2005
(Continued)

OTHER PUBLICATIONS

Mar. 29, 2017—U.S. Non-Final Office Action—U.S. Appl. No. 14/632,538.
(Continued)

*Primary Examiner* — Zhiyu Lu
(74) *Attorney, Agent, or Firm* — Banner & Witcoff, Ltd.

(57) ABSTRACT

An information processing device may be configured to communicate with a communication destination device selected as a communication target among a plurality of devices. The information processing device may store, in the storage unit, first identifying information for identifying a device that was selected as a communication destination device among the plurality of devices. The information processing device may execute a connection confirmation process confirming that a communication interface has received connection confirmation information sent by the communication destination device identified by the first identifying information stored in the storage unit when instructions are activated by the information processing device. The information processing device may display a reception confirmation image corresponding to a confirmation of the reception of the connection confirmation information in a ease that it is confirmed that the connection confirmation information sent by the communication destination device has been received.

20 Claims, 10 Drawing Sheets

(58) Field of Classification Search
CPC .... G06F 3/1257; G06F 3/1286; G06F 3/1292; Y02D 10/00; Y02D 10/1592
See application file for complete search history.

(56) References Cited

U.S. PATENT DOCUMENTS

| | | | |
|---|---|---|---|
| 2002/0001100 A1* | 1/2002 | Kawanabe | G06K 15/00 358/1.15 |
| 2003/0103081 A1* | 6/2003 | Ebuchi | G06F 3/1256 715/764 |
| 2005/0018236 A1 | 1/2005 | Shirai et al. | |
| 2005/0105130 A1 | 5/2005 | Hagiuda | |
| 2006/0192999 A1* | 8/2006 | Kawai | H04L 67/51 358/1.15 |
| 2006/0200564 A1 | 9/2006 | Watanabe et al. | |
| 2006/0203282 A1 | 9/2006 | Iwai | |
| 2006/0221863 A1* | 10/2006 | Ishimoto | G06F 3/1206 370/254 |
| 2007/0047524 A1* | 3/2007 | Moriya | G06F 3/1204 370/352 |
| 2007/0067734 A1* | 3/2007 | Cunningham | G06F 3/04817 715/779 |
| 2008/0117452 A1* | 5/2008 | Murakami | G06F 21/608 358/1.15 |
| 2008/0218816 A1 | 9/2008 | Sakuramata et al. | |
| 2009/0195818 A1* | 8/2009 | Negishi | H04N 1/00132 358/1.15 |
| 2010/0100855 A1 | 4/2010 | Yoo | |
| 2010/0177019 A1* | 7/2010 | Jeong | H04N 1/00347 345/1.3 |
| 2010/0211875 A1* | 8/2010 | Matsushita | G06F 3/167 715/716 |
| 2010/0250738 A1* | 9/2010 | Nagatani | H04L 41/0866 709/224 |
| 2010/0309515 A1* | 12/2010 | Odagawa | G06F 3/1208 358/1.15 |
| 2011/0143789 A1 | 6/2011 | Watanabe et al. | |
| 2012/0206498 A1* | 8/2012 | Kai | G06F 3/0482 345/684 |
| 2012/0262747 A1 | 10/2012 | Saito | |
| 2012/0270587 A1 | 10/2012 | Watanabe et al. | |
| 2013/0063771 A1 | 3/2013 | Song et al. | |
| 2013/0169987 A1* | 7/2013 | Akiyama | G06F 9/44505 358/1.13 |
| 2015/0365919 A1 | 12/2015 | Watanabe et al. | |

FOREIGN PATENT DOCUMENTS

| | | |
|---|---|---|
| JP | 2011-147136 A | 7/2011 |
| JP | 2013-070144 A | 4/2013 |
| JP | 2013-097769 A | 5/2013 |

OTHER PUBLICATIONS

Feb. 7, 2017—(JP) Notification of Reasons for Rejection—App 2014-034818, Eng Tran.
Jan. 30, 2018—(JP) Notification of Reasons for Revocation—JP Patent Opposition No. 2017-701134 (Patent No. 6136619), Eng Tran.
Oct. 20, 2017—U.S. Notice of Allowance—U.S. Appl. No. 14/632,538.
Apr. 16, 2018—U.S. Non-Final Office Action—U.S. Appl. No. 14/632,538.
Concise Explanation (English) of Japanese Written Opposition dated Nov. 1, 2018 for JP Patent Opposition No. 2017-701134 (Patent No. 6136619 B2, dated May 31, 2017 (App. No. 2013-127802, filed Jun. 18, 2013)).

* cited by examiner

| | Model Number | IP Address | SSID | Default Device Flag | Connection Confirmation Result | Received Model Number | Status |
|---|---|---|---|---|---|---|---|
| 611 Photo Printing | Ink-MFP1 | 192.168.100.101 | SSID-1 | ON | OK | Ink-MFP1 | Power On, No Error |
| | Ink-MFP2 | 192.168.100.102 | SSID-1 | — | — | — | — |
| | Ink-MFP3 | 211.9.36.154 | SSID-2 | — | — | — | — |
| 612 Web Printing | Ink-MFP1 | 192.168.100.101 | SSID-1 | — | OK | Ink-MFP1 | Power On, No Error |
| | Ink-MFP2 | 192.168.100.102 | SSID-1 | — | — | — | — |
| | Ink-MFP3 | 211.9.36.154 | SSID-2 | — | — | — | — |
| | Laser1 | 211.9.36.155 | SSID-2 | ON | — | — | — |
| 613 Scanning | Ink-MFP1 | 192.168.100.101 | SSID-1 | — | OK | Ink-MFP1 | Power On, No Error |
| | Ink-MFP2 | 192.168.100.102 | SSID-1 | ON | — | — | — |
| | Scan1 | 211.9.36.154 | SSID-2 | — | — | — | — |
| | Scan2 | 211.9.36.156 | SSID-2 | — | — | — | — |

FIG. 11

| | | 601 | 604 | 605 | 606 | 607 | 608 |
|---|---|---|---|---|---|---|---|
| | | Model Number | MAC Address | Default Device Flag | Connection Confirmation Result | Received Model Number | Status |
| 611 | Photo Printing | Ink-MFP4 | MAC Address-1 | ON | OK | Ink-MFP4 | Power On, No Error |
| | | Ink-MFP5 | MAC Address-2 | — | — | — | — |
| 612 | Web Printing | Ink-MFP4 | MAC Address-1 | — | OK | Ink-MFP4 | Power On, No Error |
| | | Ink-MFP5 | MAC Address-2 | — | — | — | — |
| | | Laser2 | MAC Address-4 | ON | — | — | — |
| 613 | Scan | Ink-MFP4 | MAC Address-1 | — | OK | Ink-MFP4 | Power On, No Error |
| | | Ink-MFP5 | MAC Address-2 | — | — | — | — |
| | | Scan3 | MAC Address-5 | ON | — | — | — |

700 → { 601, 604 }

TB2

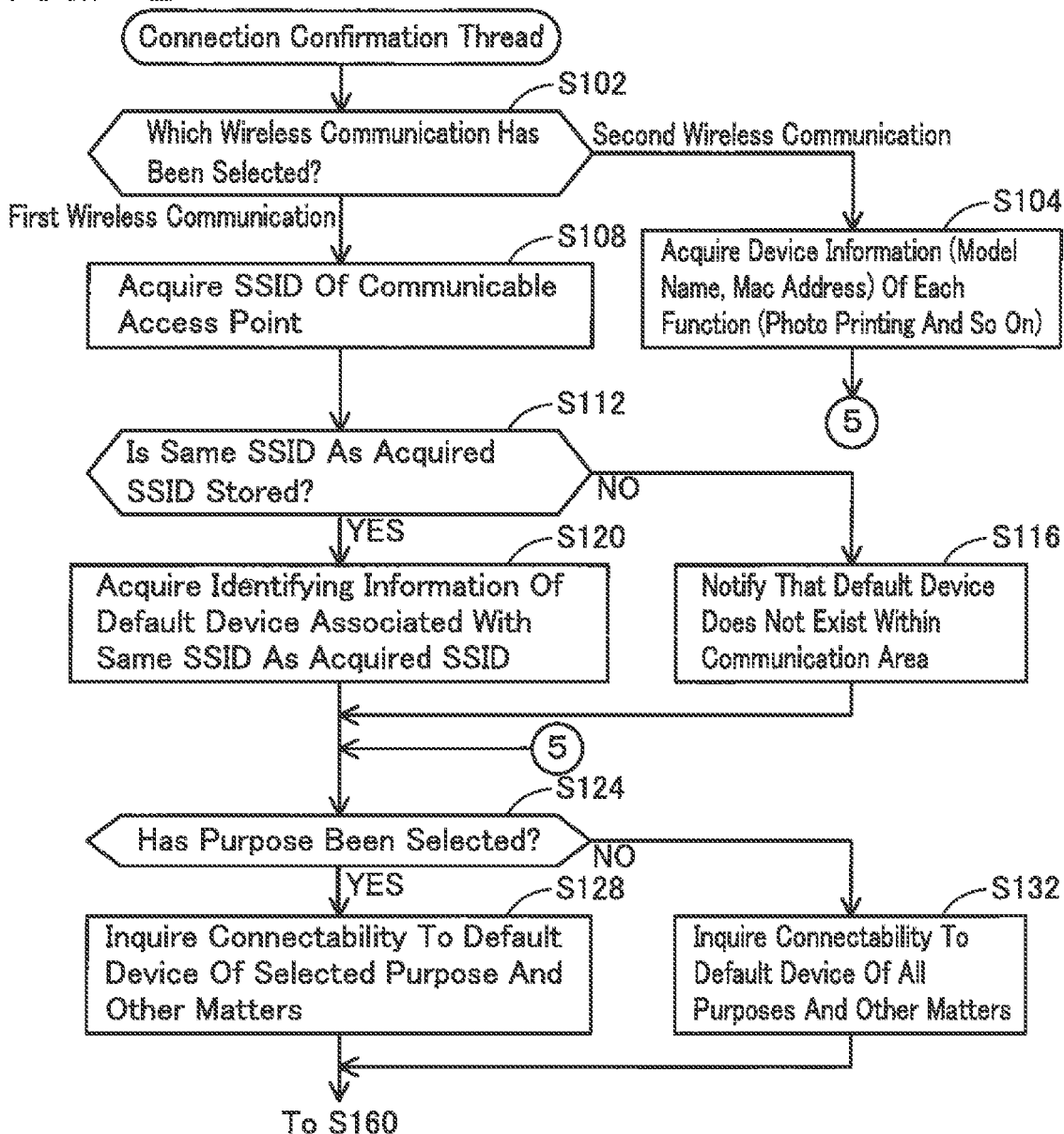

NON-TRANSITORY COMPUTER-READABLE STORAGE MEDIUM STORING INSTRUCTIONS FOR INFORMATION PROCESSING DEVICE, INFORMATION PROCESSING DEVICE, AND METHOD FOR CONTROLLING INFORMATION PROCESSING DEVICE

CROSS-REFERENCE TO RELATED APPLICATIONS

This application claims priority to Japanese Patent Application No. 2013-127802, filed on Jun. 18, 2013, the contents of which are hereby incorporated by reference into the present application.

TECHNICAL FIELD

This application relates to a non-transitory computer-readable storage medium storing instructions for an information processing device, an information processing device and a method of controlling an information processing device capable of setting devices to execute various types of processing.

DESCRIPTION OF RELATED ART

Conventionally, in a computer such as a PC, a printing environment of selecting the user's intended printer among a plurality of printers connected in a network environment and sending printing instructions to the selected printer is now in widespread use. In order to perform printing with the intended printer, the user installs a driver corresponding to that printer type. When a driver is installed, the IP address of the printer that is used via the driver is stored in the PC. Moreover, known is a technology for the user to register the most often-used printer as the default printer in the PC. Normally, the user inputs, through the PC, printing instructions to the printer that is registered as the default printer.

SUMMARY

A technology is known that performs data communication between a portable terminal and a device such as a printer. Moreover, a technology is known for the user to register a device, which is often used for communication, as the default device in the portable terminal. Nevertheless, since a portable terminal is movable, there are cases that it is not possible to communicate with the default device. In the foregoing ease, there are cases that the user-friendliness is impaired as a result of attempting to communicate with the default device.

In one aspect of the teachings disclosed herein, a non-transitory computer-readable storage medium storing instructions for an information processing device may be provided. The information processing device may be configured to communicate with a communication destination device which is selected as a communication target among a plurality of devices. The information processing device may comprises: a communication interface configured to connect with a network; a processor coupled to the communication interface; and a storage unit. The instructions may cause the information processing device to perform storing, in the storage unit, first identifying information for identifying a device that was selected as a communication destination device among the plurality of devices which are connected with the network. The instructions may cause the information processing device to perform executing a connection confirmation process confirming that the communication interface has received connection confirmation information sent by the communication destination device identified by the first identifying information stored in the storage unit when the instructions are activated by the information processing device. The instructions may cause the information processing device to perform displaying a reception confirmation image corresponding to a confirmation of the reception of the connection confirmation information in a case that it is confirmed that the connection confirmation information sent by the communication destination device has been received by the communication interface.

BRIEF DESCRIPTION OF DRAWINGS

FIG. 10 shows an example of a table;
FIG. 11 shows an example of a table;
and
FIG. 12 is a flowchart for explaining an operation example of the connection confirmation thread.

EMBODIMENT

Embodiment 1

Configuration of Network 10

Figure 1:
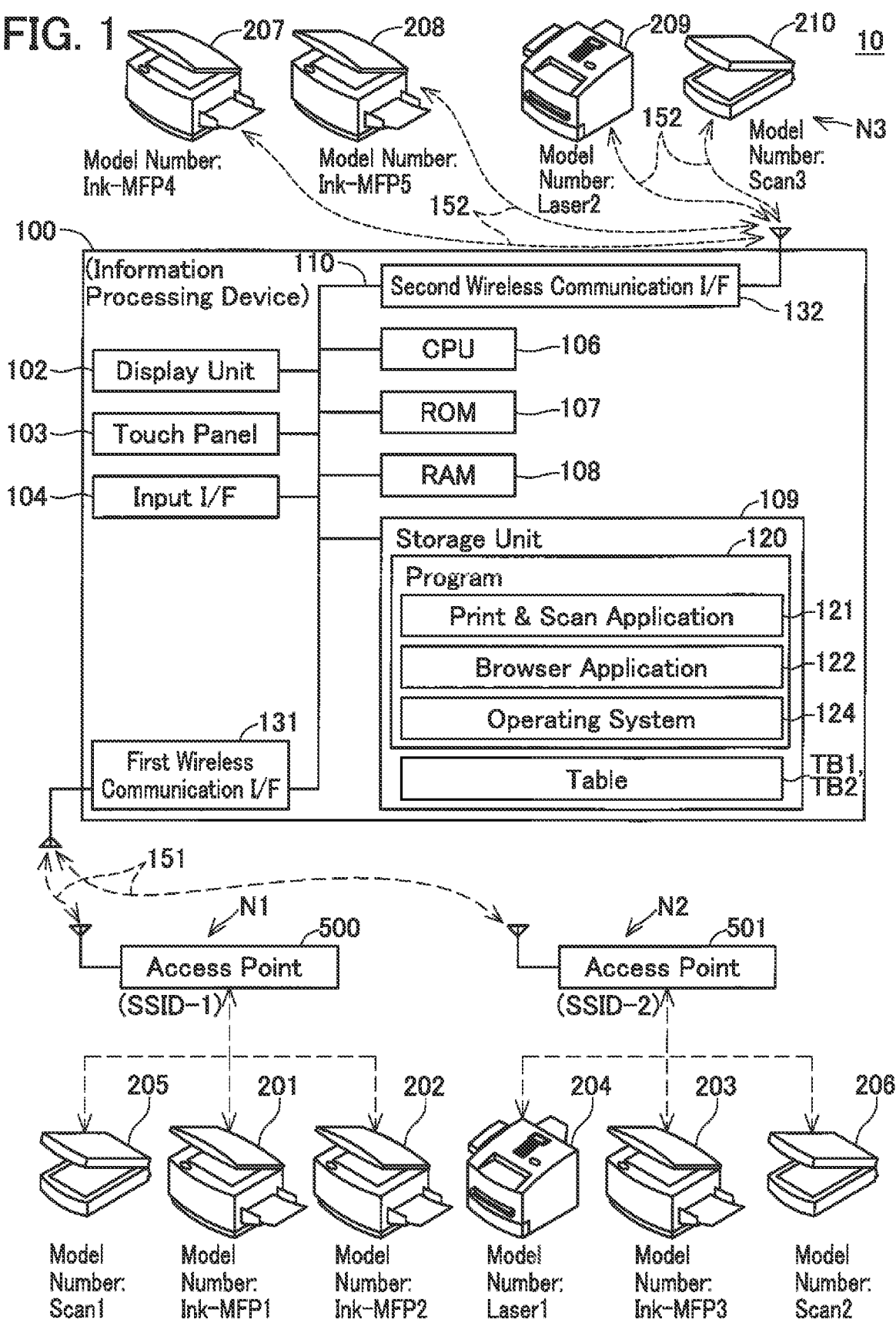
FIG. 1 shows the configuration of a network.

FIG. 1 is a block diagram showing the configuration of a network 10. The network 10 comprises an information processing device 100, inkjet MFPs 201 to 203 and 207 and 208, color laser printers 204 and 209, scanners 205, 206 and 210, and access points 500 and 501. The information processing device 100 communicates with the access point 500 or 501 based on a first wireless communication 151 via a first wireless communication I/F 131. As an example of the first wireless communication 151, there is WiFi (registered trademark of Wi-Fi Alliance) as one type of wireless LAN. A network N1 is formed based on the access point 500. Connected to the access point 500 are the inkjet MFPs 201 and 202, and the scanner 205. A network N2 is formed based on the access point 501. Connected to the access point 501 are the inkjet MFP 203, the color laser printer 204, and the scanner 206. The inkjet MFP is a multifunction peripheral comprising a printing function, a scanning function, and a copying function. The inkjet MFP is a device that is suitable for the purposes of photo printing 611, web printing 612, and scanning 613. The color laser printer is a device that is suitable for the purpose of web printing 612. The scanner is a device that is suitable for the purpose of scanning 613.

Moreover, the information processing device 100 communicates with each of the inkjet MFPs 207 and 208, the color laser printer 209, and the scanner 210 based on a second wireless communication 152 via a second wireless communication DT 132. The second wireless communication 152 is a communication capable of directly communicating with the communication-target device without going through an access point. A network N3 is formed based on the second wireless communication 152. As an example of the second wireless communication 152, there is Bluetooth (registered trademark of Bluetooth SIG, Inc.).

The information processing device 100 can execute a print & scan application 121, and send a print request or a scan request to the inkjet MFPs 201 to 203, 207 and 208, the color laser printers 204 and 209, and the scanners 205, 206 and 210 via a first wireless communication 151 or a second wireless communication 152.

The access points 500 and 501 have service set identifiers (referred to as SSIDs). An SSID is a name for identifying each of the access points 500 and 501. In the example of the first embodiment, the SSID of the access point 500 is "SSID-1", and the SSID of the access point 501 is "SSID-2", <Configuration of Information Processing Device 100>

The information processing device 100 is, for example, a portable device such as a portable phone or a portable terminal device. The information processing device 100 comprises a display unit 102, a touch panel 103, an input I/F 104, a first wireless communication I/F 131, a second wireless communication I/F 132, a CPU 106, a RAM 108, a storage unit 109 and the like, and these components are connected to each other via an 110 port 110.

The display unit 102 receives an image signal that is output from the CPU 106, and displays an image based on the received image signal. As the display unit 102, used may be, for example, an LCD or an organic EL panel. The touch panel 103 is formed from a transparent member, and disposed so as to cover the surface of the display unit 102. The touch panel 103 detects the position that was touched with the user's finger or the like, and outputs the detected position information to the CPU 106. In the ensuing explanation, the reception of the position information, which was output from the touch panel 103, by the CPU 106 is referred to as the CPU 106 accepting the touch or other similar expressions. The input I/F 104 is, for example, an operation button.

The CPU 106 executes the programs stored in the storage unit 109. The RAM 108 temporarily stores information that is required for the processing to be performed by the CPU 106. The storage unit 109 may also be a computer-readable storage medium. A computer-readable storage medium is for example, a non-transitory medium such as a ROM, a RAM, a flash memory, and a hard disk. Electric signals that deliver programs that are downloaded from an online server or the like do not correspond to a non-transitory medium. The storage unit 109 may also be configured by combining a flash memory, a hard disk (referred to as HDD), and a buffer provided in the CPU 106. The storage unit 109 can store image data, document data and the like. The storage unit 109 additionally stores information such as a processing execution reservation flag, a communication path flag, and executed purpose information, which are described later.

The storage unit 109 stores a program 120. The program 120 includes a print & scan application 121, a browser application 122, an operating system 124, and the like. The CPU 106 executes processing according to the program 120 stored in the storage unit 109. In the ensuing explanation, the CPU 106 to execute programs such as the print & scan application 121 and the operating system 124 is sometimes simply referred to by the program name. For example, the indication of "print & scan application 121" may mean "the CPU 106 that executes the print & scan application 121". The print & scan application 121 is an application for causing the CPU 106 to execute processing for causing the inkjet MFP and the like to perform print processing or scan processing. The browser application 122 is an application for displaying web data on the display unit 102. The operating system 124 is a program for providing the basic functions that are commonly used by the print & scan application 121 and the like. The operating system 124 includes a program for causing the first wireless communication I/F 131 to execute the first wireless communication 151, and a program for causing the second wireless communication I/F 132 to execute the second wireless communication 152.

Moreover, the storage unit 109 stores tables TB1 and TB2. The table TB1 is a table for storing the default device when the first wireless communication 151 is used. Moreover, the table TB2 is a table for storing the default device when the second wireless communication 152 is used. The default device is a device that is selected in advance as the device to execute printing among a plurality of devices.

FIG. 10 shows an example of the table TB1. The table TB1 comprises storage areas for each of the three types of purposes of photo printing 611, web printing 612, and scanning 613. The storage area for the purpose of photo printing 611 stores information regarding the devices that are suitable for photo printing. In photo printing, the information processing device 100 sends a print request of image data based on JPEG, Bitmap, GIF or the like to a device equipped with a printing function, and cause the device to execute printing (hereinafter referred to as the "photo print processing") is performed. The storage area for the purpose of web printing 612 stores information regarding the devices that are suitable for web printing. In web printing, the information processing device 100 sends a print request of a web page to a device equipped with a printing function, and cause the device to execute printing (hereinafter referred to as the "web print processing") is performed. The storage area for the purpose of scanning 613 stores information regarding the devices that are suitable for scanning. In scanning, the information processing device 100 sends a scan request to a device equipped with a scanning function, and cause the device to execute scanning (hereinafter referred to as the "scan processing") is performed. Note that the photo print processing and the web print processing are sometimes collectively referred to as "print processing".

The table TB1 stores, as information related to the devices, identifying information 600, a default device flag 605, a connection confirmation result 606, a received model number 607, and a status 608. The identifying information 600 is information for identifying the device, and comprises a model number 601, an IP address 602, and an SSID 603. The identifying information 600 is stored in correspondence with the respective purposes of photo printing 611, web printing 612, and scanning 613. The model number 601 is information for identifying the type of each device. In the first embodiment, the model number 601 of the respective devices of the inkjet MIFPs 201 to 203 is "Ink-MFP1", "Ink-MFP2", and "Ink-MFP3". The model number 601 of the device of the color laser printer 204 is "Lased". The model number 601 of the respective devices of the scanners 205 and 206 is "Scan1" and "Scan2". The IP address 602 is an identification number that is assigned to the respective devices and used in the communication. The SSID 603 is information for identifying the access point of the communication destination.

The default device flag 605 is information indicating the default device. The default device is one device that is set for each purpose. The default device is a device that is preferentially used among a plurality of devices when there is a plurality of devices capable of executing processing related to a certain purpose. The table TB1 is edited in a connection confirmation thread described later (for example, S168, S171), when various settings are changed in the setting screen SR4, or when print processing or scan processing is executed (S580).

The connection confirmation result 606 is information indicating a result of the connection confirmation thread described later. A device in which the connection confirmation result 606 is "OK" is a device which has been confirmed as being connectable. A device in which the connection confirmation result 606 is "NG" is a device which has been confirmed as being non-connectable. The received model number 607 is a model number of the device of the communication destination that was received from the device of the connection destination based on the connection confirmation thread. The status 608 is information indicating the device status of the device of the communication destination that was received from the device of the connection destination based on the connection confirmation thread. As examples of the device status, there are a power ON status, and an error status.

FIG. 11 shows an example of the table TB2. The table TB2 stores, as information related to the devices, identifying information 700 and a default device flag 605. The identifying information 700 comprises a model number 601 and a MAC address 604. The MAC address 604 is a physical address that is unique to the respective devices. The MAC address 604 is information that is used when the second wireless communication 152 is executed. The table TB2 is also edited in the connection confirmation thread described later, when various settings are changed in the setting screen SR4, or when print processing or scan processing is executed. Note that, in the table TB2, since the contents of information given the same reference numeral as the information of the table TB1 have been previously explained during the explanation of the table TB1, the explanation of redundant information is omitted.

Some features relating to the description in the present specification are hereby explained. In the present specification, the description "the CPU 106 of the information processing device 100 receives various types of information" includes the technical meaning "the CPU 106 of the information processing device 100 acquires various types of information via the first wireless communication I/F 131 or the second wireless communication I/F 132". Further, the description "the CPU 106 of the information processing device 100 sends various types of information" includes the technical meaning "the CPU 106 of the information processing device 100 outputs various types of information via the first wireless communication I/F 131 or the second wireless communication I/F 132".

Here, a definition of the words "data" and "information" will be explained. In the present specification, "information" is used as a concept superordinate to "data". Consequently, "A data" may be rephrased as "A information". Further, "B data", which is duplicated or converted from "A data", is "A information" as long as it is used having a meaning equal to the "A data".

<Operation of Print & Scan Application 121>

Figure 2:
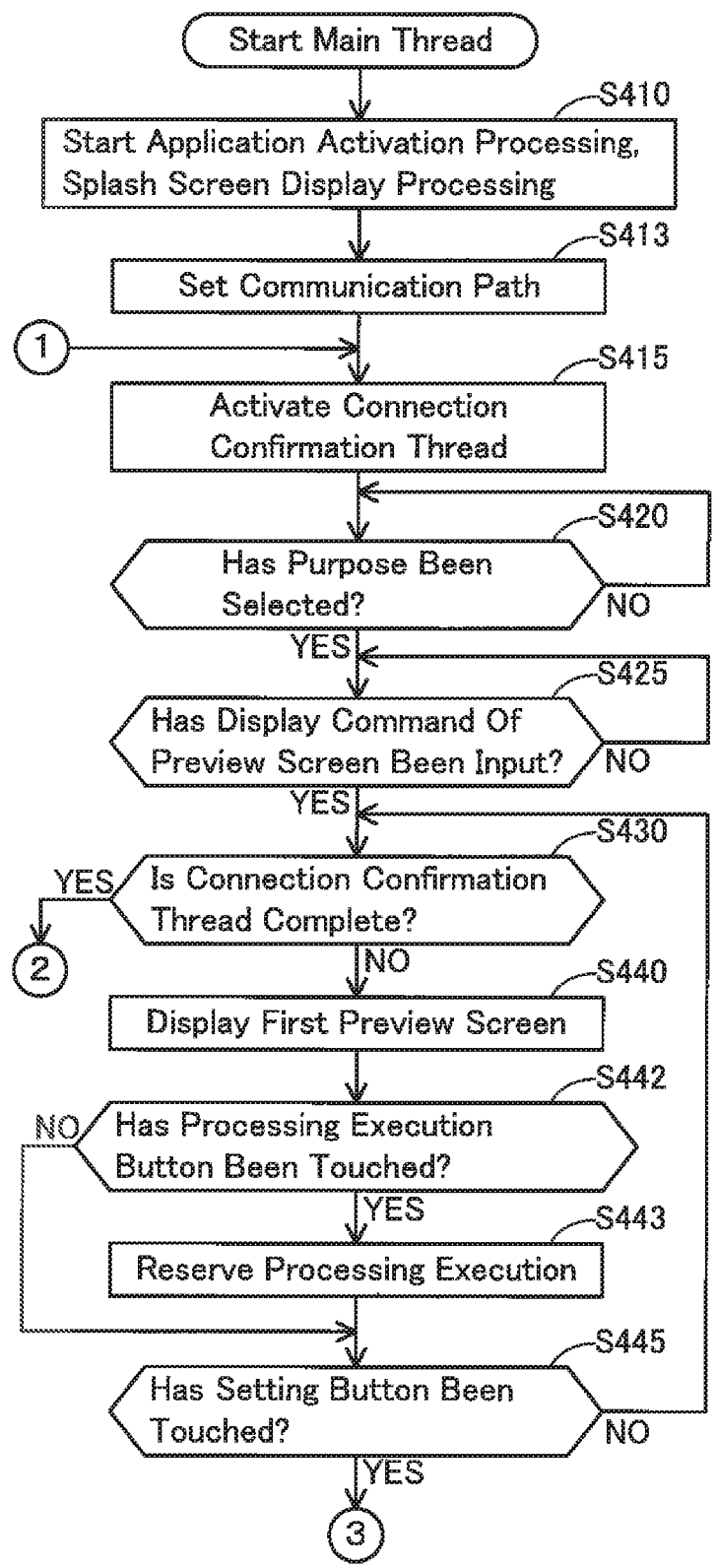
FIG. 2 is a flowchart for explaining an operation example of the main thread.
Figure 3:
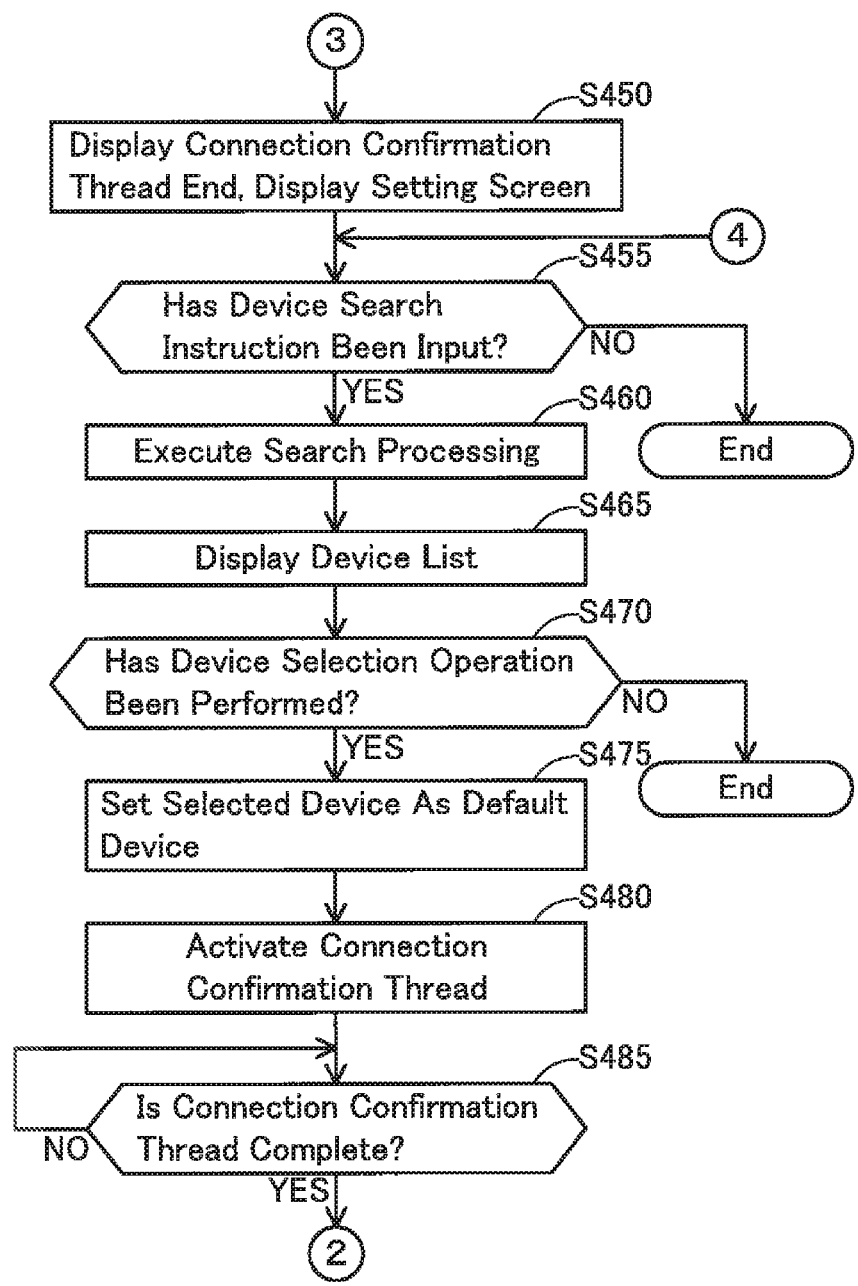
FIG. 3 is a flowchart for explaining an operation example of the main thread.

The processing performed by the CPU 106 to control the respective components according to the print & scan application 121 is now explained. When the print & scan application 121 is activated, a main thread shown in FIG. 2 is started.

In S410, the CPU 106 starts activation processing of the print & scan application 121. Moreover, the CPU 106 starts splash screen display processing. A splash screen is a screen showing that the print & scan application 121 is being activated. The activation processing of the print & scan application 121 and the splash screen display processing are processing that can be executed in parallel with the connection confirmation thread described later.

In S413, the CPU 106 sets a communication path, which was last used in the previous communication, as the communication path to be used this time. Specifically, the CPU 106 sets either the first wireless communication 151 or the second wireless communication 152 as the communication path to be used this time according to the communication path flag stored in the storage unit 109.

In S415, the CPU 106 activates the connection confirmation thread. The connection confirmation thread is processing for confirming whether communication with the default device is possible.

Figure 5:
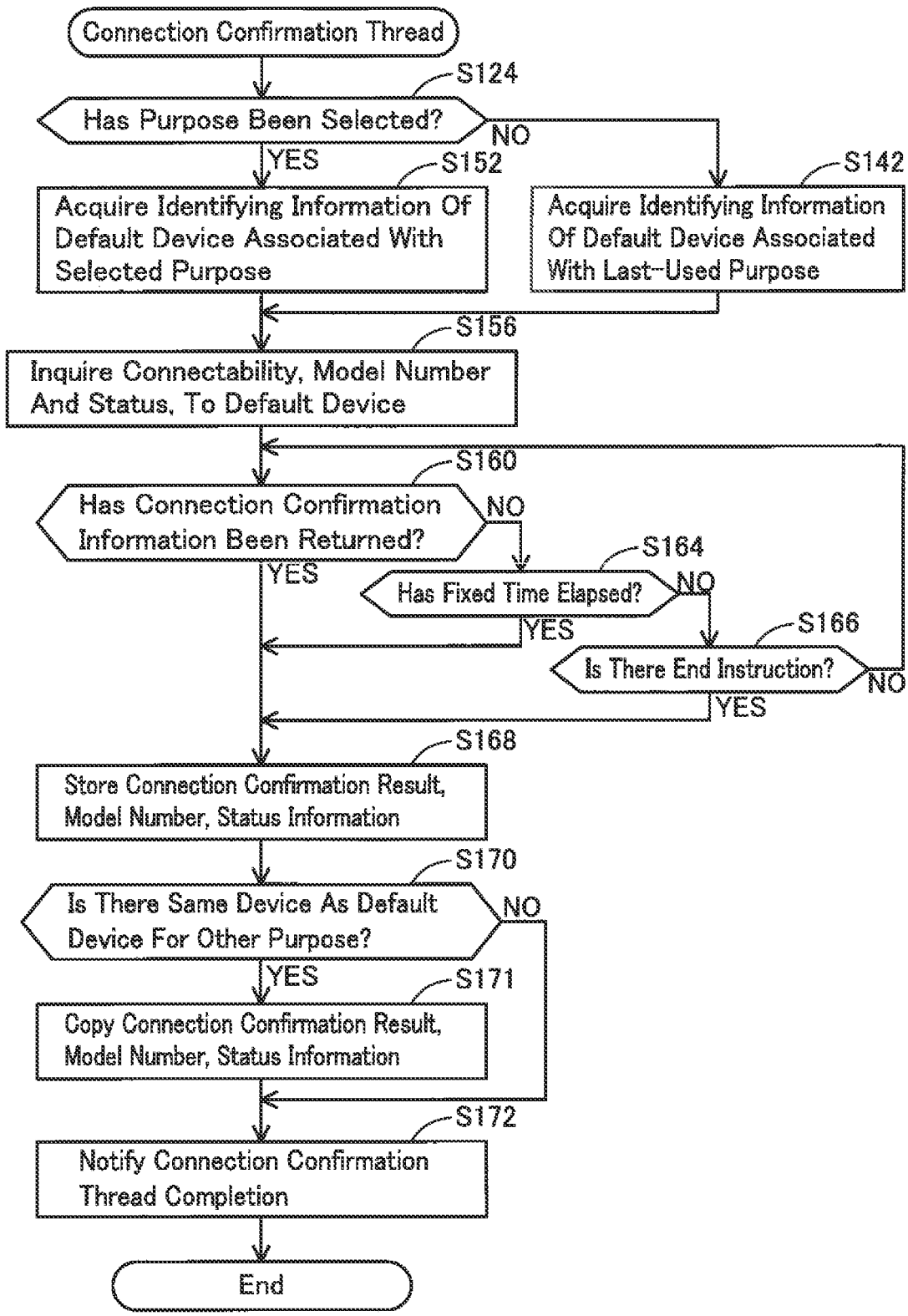
FIG. 5 is a flowchart for explaining an operation example of the connection confirmation thread.

The processing contents of the connection confirmation thread are now explained with reference to the flow of FIG. 5. In S124, the CPU 106 determines whether the purpose to be executed has been selected among the three types of purposes of photo printing 611, web printing 612, and scanning 613. Specifically, the CPU 106 determines whether the result of the determination in S420 of FIG. 2 described later was a result indicating that the purpose had been selected by the user. When a positive determination is obtained (S124: YES), the CPU 106 proceeds to S152.

In S152, the CPU 106 acquires the identifying information of the default device associated with the selected purpose. For example, in a case that the first wireless communication 151 has been selected as the communication path. When the photo printing 611 is selected as the purpose, the CPU 106 refers to the storage area corresponding to photo printing 611 in the table TB1 of FIG. 10. Subsequently, the CPU 106 reads the identifying information 600 of the device in which the default device flag 605 is "ON". For example, in a case that the second wireless communication 152 has been selected as the communication path, when the seaming 613 is selected as the purpose, the CPU 106 refers to the storage area corresponding to scanning 613 in the table TB2 of FIG. 11. Subsequently, the CPU 106 reads the identifying information 700 of the device in which the default device flag 605 is "ON".

Meanwhile, when a negative determination is obtained in S124 (S124: NO), the CPU 106 proceeds to S142. In S142, the CPU 106 acquires the identifying information of the default device information associated with the purpose that was last used. Specifically, the CPU 106 reads the executed purpose information described later in S580, and specifies the purpose for which the processing thereof was last executed. Subsequently, the CPU 106 refers to the column of the purpose for which the processing thereof was last executed in the table TB1 or the table TB2, and reads the identifying information 600 of the device in which the default device flag 605 is "ON".

In S156, the CPU 106 executes the connection confirmation processing. The connection confirmation processing is processing of making an inquiry to the default device regarding connectability, model number, and status. Specifically, the CPU 106 uses the identifying information 600 or 700 acquired in S152 and attempts to communicate with the default device.

In S160, the CPU 106 determines whether the connection confirmation information was returned from the default device. The connection confirmation information is information which confirms that the communication connection is possible. When a positive determination is obtained in S160 (S160: YES), the CPU 106 proceeds to S168. In S168, the CPU 106 stores the "OK" information indicating that connection to the default device is possible in the connection confirmation result 606 of the table TB1 or the table TB2. Moreover, the CPU 106 stores the model number of the default device itself, which was received from the default device, in the column of the received model number 607. Moreover, the CPU 106 stores the status information received from the default device in the column of the status 608.

Meanwhile, when a negative determination is obtained in S160 (S160: NO), the CPU 106 proceeds to S164. In S164, the CPU 106 determines whether a predetermined fixed time has elapsed. When a positive determination is obtained (S164: YES), the CPU 106 proceeds to S168. In S168, the CPU 106 stores "NG" information indicating that connection to the default device is not possible in the connection confirmation result 606 of the table TB1 or the table TB2. Meanwhile, when a negative determination is obtained in S164 (S164: NO), the CPU 106 proceeds to S166.

In S166, the CPU 106 determines whether an end instruction has been input by the user. The end instruction may be input, for example, by displaying a button image for accepting the end of the connection confirmation thread on the display unit 102, and touching the button. When a negative determination is obtained (S166: NO), the CPU 106 returns to S160. Meanwhile, when a positive determination is obtained (S166: YES), the CPU 106 proceeds to S168, and stores "NG" information indicating that connection to the default device is not possible in the connection confirmation result 606 of the table TB1 or the table TB2.

In S170, the CPU 106 determines whether a device that is the same as the default device is stored in a column of another purpose, other than the purpose for which the connection confirmation thread was executed, in the table TB1 or the table TB2. When a negative determination is obtained (S170: NO), the CPU 106 proceeds to S172, and when a positive determination is obtained (S170: YES), the CPU 106 proceeds to S171. In S171, the CPU 106 copies the "OK" information indicating that connection to the default device is possible, the received model number, and the status information to the connection confirmation result 606, the received model number 607, and the status 608 of the device of the other purpose.

In S172, the CPU 106 notifies the completion of the connection confirmation thread to the main thread. The CPU 106 thereby ends the connection confirmation thread.

In S420 of FIG. 2, the CPU 106 determines whether the purpose has been selected by the user. For example, a button for selecting the respective purposes of photo printing 611, web printing 612, and scanning 613 may be displayed on the display unit 102 to accept touch inputs. When any one of the buttons is touched, it may be determined that the purpose corresponding to the touched button has been selected. When a negative determination is obtained in S420 (S420: NO), the CPU 106 returns to S420, and when a positive determination is obtained (S420: YES), the CPU 106 proceeds to S425.

In S425, the CPU 106 determines whether a preview screen display command has been input by the user. This determination may be made by displaying a button image for accepting the input of the preview screen display command on the display unit 102, and determining whether the button has been touched. When the selected purpose is photo printing 611, the button image for selecting the photo data to be previewed among a plurality of photo data may concurrently serve as the button image for accepting the input of the preview screen display command. When the selected purpose is web printing 612, a configuration may be adopted where a button image for accepting the input of the preview screen display command is also displayed on the screen displaying the web page. Moreover, the button image for accepting the selection of scanning 613 may concurrently serve as the button for accepting the input of the preview screen display command. When the selected purpose is photo printing 611 or web printing 612, the preview screen is a screen including a print preview image. Moreover, when the selected purpose is scanning 613, the preview screen is a screen including a scan preview image. When a negative determination is obtained in S425 (S425: NO), the CPU 106 returns to S425, and when a positive determination is obtained (S425: YES), the CPU 106 proceeds to S430.

In S430, the CPU 106 determines whether the connection confirmation thread that was started in S415 is completed. When a positive determination is obtained (S430: YES), the CPU 106 proceeds to S510, and when a negative determination is obtained (S430: NO), the CPU 106 proceeds to S440.

In S440, the CPU 106 displays a first preview screen on the display unit 102. The first preview screen is a screen that is displayed when the connection confirmation thread is being executed. The processing for displaying the first preview screen may be executed in parallel with the connection confirmation thread.

Figure 6:
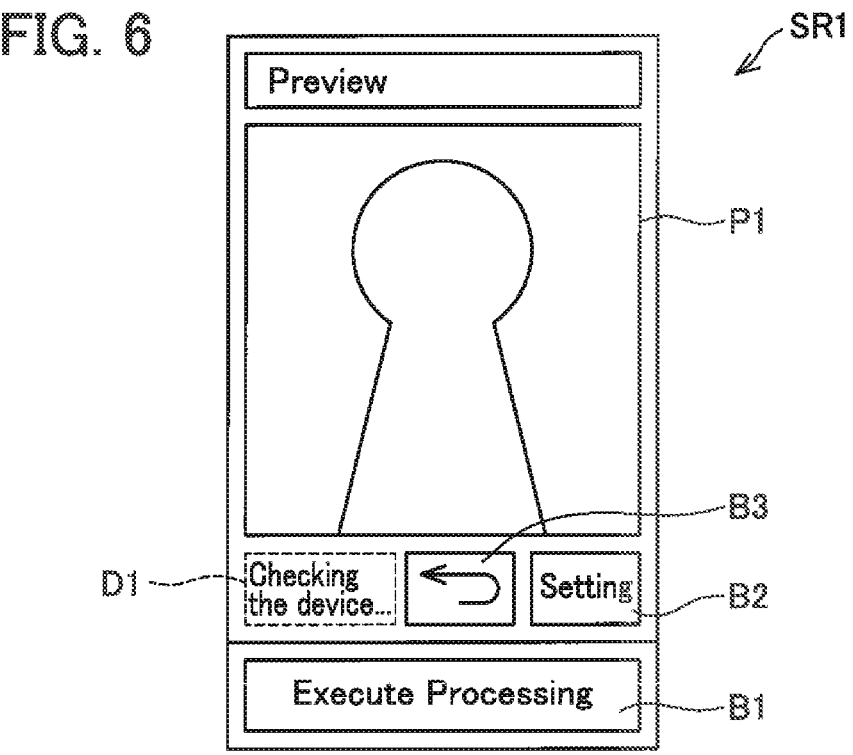
FIG. 6 shows an example of a first preview screen.

FIG. 6 shows a display example of a first preview screen SR1. The first preview screen SR1 includes a preview image P1, a processing execution button B1, a setting button B2, a back button B3, and processing status information D1. The preview image P1 is an image indicating the print preview or the scan preview. When the selected purpose is photo printing 611 or web printing 612, the preview image P1 is an image that indicates the print mode of causing the default device to perform print processing. Meanwhile, when the selected purpose is scanning 613, the preview image P1 is blank. This is because, in print processing, since the image data is stored in the information processing device 100, a preview image can be generated prior to starting the communication with the default device, but in scan processing, since the image data is generated by the default device, a preview image cannot be generated prior to starting the communication with the default device.

The processing execution button B1 is a button for accepting the input of the print execution command or the scan execution command. The setting button B2 is a button for displaying the setting screen. The setting screen is a screen for accepting inputs or changes of various settings related to printing or scanning. The back button B3 is a button for accepting the processing of returning the display screen to the immediately preceding screen. The back button B3 may also be a physical key equipped in the input I/F 104. The processing status information D1 is information indicating the connection confirmation thread is being executed. For example, the processing status information D1 may also be a character string such as "Checking the device . . . ". Moreover, for example, the processing status information D1 may also be an animation image using a progress bar or the like.

In S442, the CPU 106 determines whether the processing execution button B1 has been touched. When a negative determination is obtained (S442: NO), the CPU 106 proceeds to S445, and when a positive determination is obtained (S442: YES), the CPU 106 proceeds to S443. In S443, the CPU 106 performs the processing execution reservation. The processing execution reservation is processing for accepting, while the connection confirmation thread is being executed, the instruction for causing the default device to execute print processing or scan processing. Specifically, the processing execution reservation flag stored in the storage unit 109 is set to "ON".

In S445, the CPU 106 determines whether the setting button B2 has been touched. When a negative determination is obtained (S445: NO), the CPU 106 returns to S430, and when a positive determination is obtained (S445: YES), the CPU 106 proceeds to S450.

Figure 8:
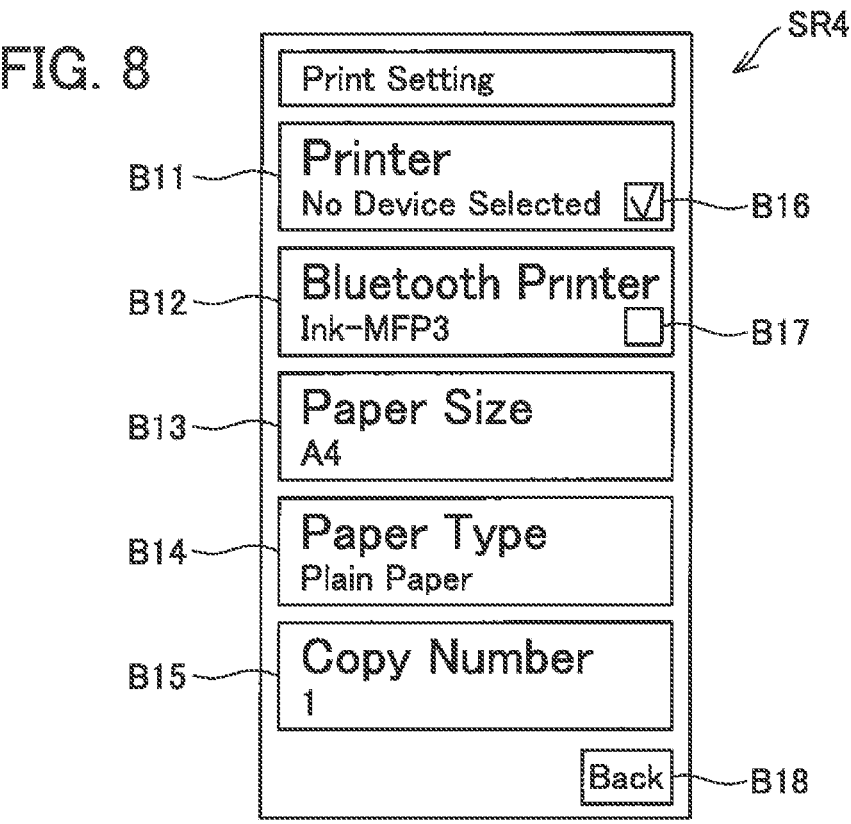
FIG. 8 shows an example of a setting screen.

In S450, the CPU 106 displays on the display unit 102, for a fixed time, information indicating that the connection confirmation thread that is being executed will be ended midway. In addition, the CPU 106 displays a setting screen on the display unit 102. FIG. 8 shows a display example of a setting screen SR4. The setting screen SR4 is a screen example of a case that the selected purpose is photo printing 611 or web printing 612. The setting screen SR4 includes a first default device selection button B11, a second default device selection button B12, a paper size selection button B13, a paper type selection button B14, a copy number button B15, a first communication path selection button B16, a second communication path selection button B17, and a back button B18. The first default device selection button B11 is a button for accepting the instruction for setting the default device when the first wireless communication 151 is to be selected as the communication path. The setting of the default device includes, in cases when the default device has been previously set, re-selecting another device as the default device. The first default device selection button B11 may also display information indicating that the default device has not yet been selected (for example, No Device Selected). The second default device selection button B12 is a button for accepting the instruction for setting the default device when the second wireless communication 152 is to be selected as the communication path. The second default device selection button B12 may also display information indicating that the default device has not yet been selected. The first communication path selection button. B16 is a button for accepting a request for selecting the first wireless communication 151 as the communication path. The second communication path selection button B17 is a button for accepting a request for selecting the second wireless communication 152 as the communication path. Note that, when the first default device selection button B11 or the first communication path selection button B16 is touched in a state where neither the first wireless communication 151 nor the second wireless communication 152 is selected as the communication path, the CPU 106 operates on the assumption that a request for selecting the first wireless communication 151 as the communication path and a request for newly selecting the default device have been received. Moreover, when the second default device selection button B12 or the second communication path selection button B17 is touched in the state where neither the first wireless communication 151 nor the second wireless communication 152 is selected as the communication path, the CPU 106 operates on the assumption that a request for selecting the second wireless communication 152 as the communication path and a request for newly selecting the default device have been received.

The paper size selection button B13 is a button for accepting the setting of the paper size to be used in the printing to be executed by the default device. As examples of the paper size, there are, for example, A4 size, B5 size and the like. The paper type selection button B14 is a button for accepting the setting of the paper type to be used in the printing to be executed by the default device. As examples of the paper type, there are, for example, plain paper, gloss paper and the like. The copy number button B15 is a button for accepting the setting of the number of copies to be printed in the printing to be executed by the default device. The currently selected print setting may also be displayed on the buttons B13 to B15. The back button B18 is a button for accepting the processing of returning the display screen to the immediately preceding screen.

In S455, the CPU 106 determines whether a device search instruction, in order to search for a device which is capable of executing the selected purpose and which can communicate based on the selected communication path, has been input. Specifically, the CPU 106 determines whether any one of the following has been performed; namely, the first default device selection button B11 has been touched, the second default device selection button B12 has been touch, and either the button B16 or the button B17 has been touched in a state in which neither the first wireless communication 151 nor the second wireless communication 152 is selected as the communication path. When a negative determination is obtained (S455: NO), the CPU 106 ends the main thread, and when a positive determination is obtained (S455: YES), the CPU 106 proceeds to S460.

In S460, the CPU 106 executes the search processing to search for a communicable device. As an example, the search processing in a case that the first default device selection button B11 is touched and the first wireless communication 151 is selected as the communication path is explained. The CPU 106 acquires the SSID of the access point; that is, either the access point 500 or the access point 501, to which the information processing device 100 is currently connected. The information processing device 100 is connected to one of the access points among a plurality of access points within a communicable range based on the operation of the operating system 124. The print & scan application 121 recognizes the currently-connected access point based on the information output by the operating system 124. Subsequently, the CPU 106 broadcasts a request to the device connected to an access point in a communicable state for returning the identifying information of the device (for example, model number), and receives the returned identifying information.

In S465, the CPU 106 displays, on the display unit 102, a list of the identifying information received from the device that was searched in S460. In other words, when a device list is displayed, devices corresponding to the currently-selected communication path are displayed. Here, the identifying information of the default device may also be displayed preferentially to the identifying information of other devices. For example, assumed is a case that the purpose of photo printing 611 is selected in the table TB1 of FIG. 10 in a case that the first wireless communication 151 has been selected. In the foregoing case, when connected to the access point 500, the model number "Ink-MFP1" of the inkjet MFP 201 and the model number "Ink-MFP2" of the inkjet MFP 202 are displayed. Here, the model number "Ink-MFP1" indicating the default device is displayed preferentially to the model number "Ink-MFP2" indicating another device. Moreover, the CPU 106 may also display, on the display unit 102, an input column for inputting the IP address of a new device.

Moreover, for example, assumed is a case that the purpose of photo printing 611 is selected in the table TB2 of FIG. 11 in a case that the second wireless communication 152 has been selected. In the foregoing ease, the model number "Ink-MFP4" of the inkjet MFP 207 and the model number "Ink-MFP5" of the inkjet MIT 208 are displayed. Here, the model number "Ink-MFP4" indicating the default device is displayed preferentially to the model number "Ink-MFP5" indicating another device.

In S470, the CPU 106 determines whether the touch panel 103 has accepted a device selection operation, which is an operation of selecting the displayed model number and the like. When a negative determination is obtained (S470: NO), the CPU 106 ends the main thread, and when a positive determination is obtained (S470: YES), the CPU 106 proceeds to S475.

In S475, the CPU 106 sets the device selected by the user in S470 as the default device. Specifically, the CPU 106 selects the table TB1 when the first wireless communication 151 has been set as the communication path and selects the table TB2 when the second wireless communication 152 has been set as the communication path. In the selected table, the CPU 106 selects the region corresponding to the purpose selected in S420. In the selected region, the CPU 106 sets only the default device flag 605 of the device that was newly set as the default device to "ON", and sets the default device flag 605 of the other devices to "OFF".

In S480, the CPU 106 activates the connection confirmation thread. Since the processing contents of the connection confirmation thread have been previously explained, the explanation thereof is omitted. In S485, the CPU 106 determines whether the connection confirmation thread started in S480 is completed. When a negative determination is obtained (S485: NO), the CPU 106 returns to S485, and when a positive determination is obtained (S485: YES), the CPU 106 proceeds to S510.

In S510, the CPU 106 determines the confirmation result of the connection confirmation thread. When a result to the effect that connection to the default device is possible (S510: OK), the CPU 106 proceeds to S550.

Moreover, when it is determined that connection to the default device is possible but the model of the default device has been changed in S510 (S510: different model), the CPU 106 proceeds to S525. Determination on whether the model of the default device has been changed may also be made based on whether the model number 601 and the received model number 607 coincide in the table TB1 or the table TB2. As an example of a case in which the model of the default device is changed, considered may be a case that the model number was changed as a result of renewing the default device, but the communication setting of the IP address and the like is the same setting as the old device before renewal.

In S525, the CPU 106 determines whether the default device after the model change is a model capable of executing the current processing setting. When a negative determination is obtained (S525: NO), the CPU 106 proceeds to S530. As an example when a negative determination is obtained, considered may be a case that, in a case that the old device is compatible with printing A3 size paper and the new device is not compatible with printing A3 size, A3 size is set as the current print setting. In S530, the CPU 106 display error information on the display unit 102. As the content of the error information, the content may also be an indication to the effect that the model of the device registered as the default device and the model of the current default device are different. The CPU 106 thereafter returns to S455. Meanwhile, when a positive determination is obtained in S525 (S525: YES), the CPU 106 proceeds to S550.

Figure 7:
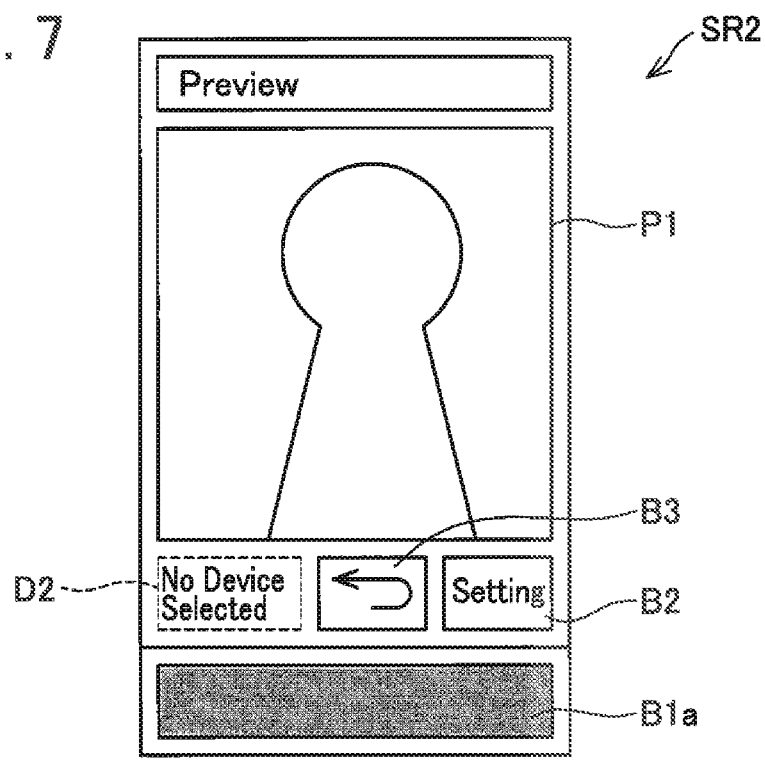
FIG. 7 shows an example of a second preview screen.

Meanwhile, in S510, when a result to the effect that connection to the default device is not possible (S510: NG), the CPU 106 proceeds to S535. In S535, the CPU 106 displays a second preview screen. The CPU 106 thereafter returns to S445. The second preview screen is a screen that is displayed when it is not possible to accept a print execution instruction. FIG. 7 shows a display example of a second preview screen SR2. The second preview screen SR2 includes a processing execution button B1a, and default device information D2. The processing execution button B1a is a button for displaying that the input of a processing execution command cannot be accepted. The processing execution button B1a may also be a button in which the processing execution button B1 shown in FIG. 6 is grayed out. The default device information D2 may also be information indicating that connected to the default device is not possible (for example, character string of No Device Selected).

In S550, the CPU 106 determines whether the device status of the default device is a status capable of executing processing. This determination may also be made based on the information that is stored in the column of the status 608 of the table TB1 or the table TB2. For example, in a case that the print processing is to be executed by the default device, when information of "No ink" is stored in the column of the status 608 of the default device, it is determined that this is not a status capable of executing processing. In S550, when it is determined that this is a status in which processing cannot be executed (S550: NG), the CPU 106 proceeds to S555. In S555, the CPU 106 displays the second preview screen. Since the second preview screen has been explained with reference to FIG. 7, the explanation thereof is omitted.

Meanwhile, in S550, when it is determined that this is a status in which processing can be executed (S550: OK), the CPU 106 proceeds to S556. In S556, the CPU 106 determines whether the currently-selected purpose is scanning 613. When a negative determination is obtained (S556: NO), the CPU 106 proceeds to S560, and when a positive determination is obtained (S556: YES), the CPU 106 proceeds to S557. In S557, the CPU 106 acquires scan preview image data from the default device.

Figure 9:
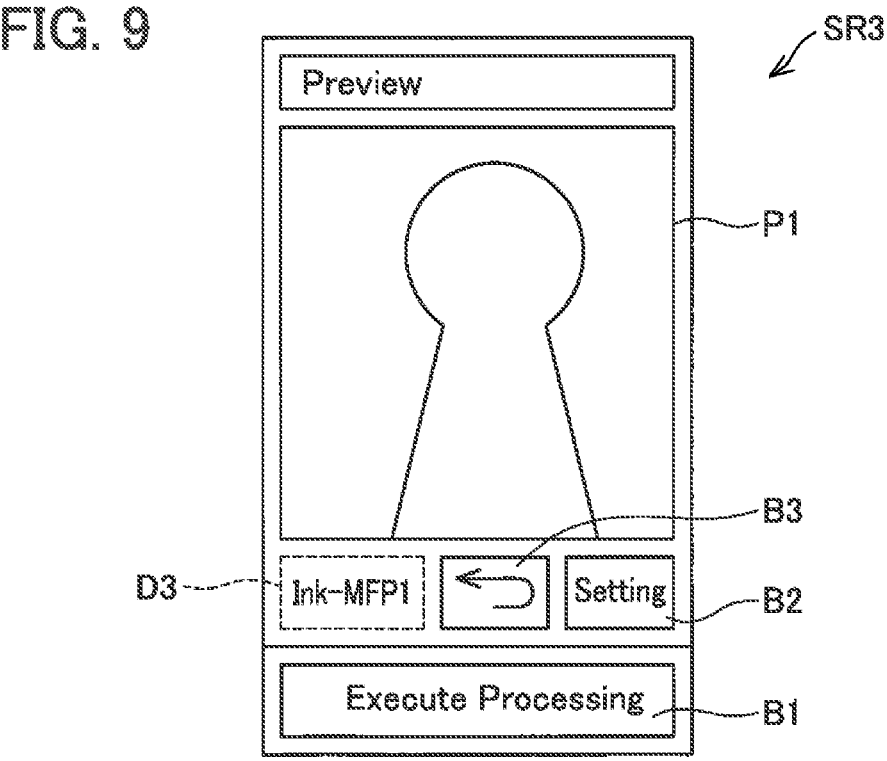
FIG. 9 shows an example of a second preview screen.

In S560, the CPU 106 displays a third preview screen. The third preview screen is a screen that is displayed when it is possible to accept a processing execution instruction. FIG. 9 shows a display example of a third preview screen SR3. The third preview screen SR3 includes default device information D3. The default device information D3 is reception confirmation information indicating that the connection confirmation information was returned and received from the default device in S160. In other words, the default device information D3 is information indicating that communication with the default device is possible. The default device information D3 may also be information for identifying the default device (for example, model number).

In S510, when a result to the effect that connection to the default device is possible (S510: OK), the default device information D3 includes the model number of the default device. Moreover, in S510, when a result to the effect that the model of the default device has been changed (S510: different model), the default device information D3 includes the model number of the default device after the model change.

In S565, the CPU 106 determines whether processing execution reservation was performed in S443. This determination may also be made by reading a processing execution reservation flag from the storage unit 109. When a positive determination is obtained (S565: YES), the CPU 106 proceeds to S575, and the CPU 106 executes the processing that was reserved. Moreover, when a negative determination is obtained (S565: NO), the CPU 106 proceeds to S570.

In S570, the CPU 106 determines whether the processing execution button B1 of the third preview screen SR3 has been touched. When a negative determination is obtained (S570: NO), the CPU 106 returns to S560, and when a positive determination is obtained (S570: YES), the CPU 106 proceeds to S575.

In S575, the CPU 106 executes print processing or scan processing. Print processing is executed when the content of the purpose selected in S420 is "photo printing 611" or "web printing 612". In print processing, the CPU 106 sends print data to the default device via the first wireless communication 151 or the second wireless communication 152. The default device executes print processing using the received print data. Sean processing is executed when the content of the purpose selected in S420 is "scanning 613". In scan processing, the CPU 106 sends a scan execution instruction to the default device via the first wireless communication 151 or the second wireless communication 152. The default device reads the set document and generates scan data, and sends the generated scan data to the information processing device 100.

In S580, the CPU 106 stores, in the storage unit 109, the default device that was caused to execute the processing. Specifically, the table TB1 of FIG. 10 is selected when the communication with the default device was executed using the first wireless communication 151. Moreover, the table TB2 of FIG. 11 is selected when the communication with the default device was executed using the second wireless communication 152. In addition, the default device flag 605 of the device that executed the processing this time is set to "ON" in the column of the purpose for which the processing was executed this time among photo printing 611 to scanning 613, and the default device flag 605 of the other device is set to "OFF". It is thereby possible to store the device that executed the processing last as the default device. Moreover, the CPU 106 stores the executed purpose information in the storage unit 109. The executed purpose information may also be the name of the executed purpose. It is thereby possible to store the purpose for which the processing was executed last.

In S585, the CPU 106 stores the communication path that was used in the execution of the processing. Specifically, a communication path flag indicating whether the first wireless communication 151 or the second wireless communication 152 was used is stored in the storage unit 109. The CPU 106 thereafter ends the main thread.

Effect of Embodiment 1

In the connection confirmation thread (refer to FIG. 5), there are cases that time is required for the processing to be completed since various types of information are communicated with the default device. Moreover, there are cases that time is required for the processing to be completed in the activation processing of the print & scan application 121 (S410). According to the print & scan application 121 and the like described in this specification, the connection confirmation thread can be activated (S415) when the print & scan application 121 is activated (S410). It is thereby possible to use the processing time required for the activation processing of the print & scan application 121 as the processing time of the connection confirmation thread. Thus, the user-friendliness can be improved since the total processing time can be shortened.

According to the print & scan application 121 and the like described in this specification, the first preview screen can be displayed (S440) after the connection confirmation thread has been activated (S415). The first preview screen is a screen that is displayed when the connection confirmation thread is being executed. The processing status information D1 (refer to FIG. 6) indicating that the connection confirmation thread is being executed can be displayed in the first preview screen. Since it is thereby possible to display a preview image without having to wait for the completion of the connection confirmation thread, the preview image can be displayed without causing the user to wait, and the user-friendliness can thereby be improved. Moreover, since it is possible to cause the user to recognize that the connection confirmation thread is not yet complete, the user can understand that the default device is not in a state of being able to execute various types of processing, and the user's stress can thereby be alleviated.

According to the print & scan application 121 and the like described in this specification, when the setting button B2 is touched (S445: YES) during the period that the first preview screen is being displayed (S440), the connection confirmation thread that is being executed can be ended (S450), and the setting screen (refer to FIG. 8) can be displayed (S450). Information indicating that the default device has not yet been selected can be displayed on the setting screen (refer to first default device selection button B11). When the setting button B2 is touched, the selection of the new default device is often accepted. Thus, by ending the connection confirmation thread of the currently-selected default device, it is possible to prevent the continued execution of an unneeded connection confirmation thread, and thus possible to reduce the power consumption of the information processing device 100.

According to the print & scan application 121 and the like described in this specification, on and after the time that the selection of the new default device is selected in S470 (S470: YES), the newly selected default device can be stored in the table (S475). In other words, even in cases of displaying information on the setting screen (refer to FIG. 8) to the effect that the default device has not yet been selected in S450 or the like, from the perspective of internal processing of the information processing device 100, it is possible to attain a state in which the old default device is being selected. Consequently, the default device stored in the table will not be changed up to the stage that the selection of the new communication destination device is accepted in S470. Accordingly, in cases that the setting screen (refer to FIG. 8) was displayed but the new default device was not selected (for example, cases that the first default device selection button B11 or the second default device selection button B12 was not touched), it is possible to prevent the setting of the default device from being erased or changed. Thus, since the setting of the default device can be used once again the next time that the print & scan application 121 is activated, it is possible to improve the user-friendliness.

According to the print & scan application 121 and the like described in this specification, when the processing execution button B1 (refer to FIG. 6) is touched (S442: YES) during the period that the connection confirmation thread is being executed, processing execution reservation can be performed. It is thereby possible to cause the default device to execute various types of processing (S565: YES, S575) in accordance with the completion of the connection confirmation thread (S430: YES). Consequently, since it is not necessary to cause the user to wait to perform an input by touching the processing execution button B1 until the connection confirmation thread is completed, it is possible to improve the user-friendliness.

According to the print & scan application 121 and the like described in this specification, when one purpose has been selected (S124: YES) before the processing of inquiring the connectability to the default device (S156), it is possible to select the default device that is associated with the selected purpose (S152), and execute processing for making an inquiry to the selected default device regarding connectability (S156). Consequently, since the processing time of the connection confirmation thread can be shortened in comparison to a case of performing the connection confirmation thread for all of the plurality of default devices each corresponding to the plurality of purposes (for example, photo printing 611, web printing 612, scanning 613), it is possible to improve the user-friendliness.

According to the print & scan application 121 and the like described in this specification, when a purpose has not been selected (S124: NO), the connection confirmation thread can be executed regarding a default device corresponding to the most recently-used purpose (S142). Consequently, since the processing time of the connection confirmation thread can be shortened in comparison to a case of performing the connection confirmation thread for all of the plurality of default devices each corresponding to the plurality of purposes, it is possible to improve the user-friendliness.

According to the print & scan application 121 and the like described in this specification, when a device that is the same as the default device is associated with another purpose other than the purpose for which the connection confirmation thread was executed (S170: YES), the various types of information that are obtained from the connection confirmation thread can also be copied to the devices with which other purposes are associated (S171). For example, assumed is a ease that, in the table TB1 of FIG. 10, various types of information (refer to region R1) relating to the connection confirmation result 606, received model number 607, and status 608 are obtained, based on the connection confirmation thread, with regard to the default device corresponding to the purpose of photo printing 611 (that, device in which the model number 601 is "Ink-MFP1"). Here, in S170, it is detected that a device that is the same as the default device of photo printing 611 is also stored in web printing 612 and scanning 613 as the other purposes (refer to region R2). Thus, the various types of information that were acquired in relation to the default device corresponding to the purpose of photo printing 611 can also be copied to the devices corresponding to the purposes of web printing 612 and scanning 613 (refer to region R3, arrow Y1). It is thereby possible to share the confirmation result information, which was obtained based on the connection confirmation thread executed to one default device, with other devices. Thus, since it is possible to lighten the processing load and shorten the processing time of the connection confirmation thread, the user-friendliness can be improved.

According to the print & scan application 121 and the like described in this specification, when connection to the default device is possible but the model of the default device has been changed (S510: different model), whether the default device after the model change is a device capable of executing the current processing setting can be determined in S525. In addition, when a negative determination is obtained in S525 (S525: NO), error information can be displayed (S530). Consequently, since the unavailability of processing can be notified to the user when processing cannot be executed as a result of the device, which was stored as the default device, being replaced with a new device, it is possible to improve the user-friendliness.

According to the print & scan application 121 and the like described in this specification, when it is confirmed that communication with the default device is not possible based on the connection confirmation thread (S164: YES), the second preview screen (refer to FIG. 7) can be displayed (S535). Default device information D2 (for example, character string of 'No Device Selected') indicating that connection to the default device is not possible can be displayed on the second preview screen. Since it is thereby possible to notify the user that the default device has not yet been selected, the user-friendliness can be improved.

According to the print & scan application 121 and the like described in this specification, the splash screen display processing can be executed (S410) when the print & scan application 121 is activated (S410). Since the splash screen display processing can be executed in parallel with the connection confirmation thread, the time in which the splash screen is being displayed can also be used as the processing time of the connection confirmation thread. Thus, since the total processing time can be shortened, it is possible to improve the user-friendliness.

According to the print & scan application 121 and the like described in this specification, the default device information D3 (for example, model number) for identifying the default device can be displayed on the third preview screen (refer to FIG. 9) displayed in S560. Consequently, since the user can recognize the preview image mode and also recognize the device of the output destination of the communication information, it is possible to improve the user-friendliness.

Embodiment 2

Embodiment 2 is an embodiment that partially modifies the connection confirmation thread. The processing contents of the connection confirmation thread according to Embodiment 2 are now explained with reference to the flow of FIG. 12.

In S102, the CPU 106 determines whether the first wireless communication 151 or the second wireless communication 152 has been selected for the communication with the default device. When the first wireless communication 151 has been selected (S102: first wireless communication), the CPU 106 proceeds to S108. In S108, the CPU 106 acquires the SSID of the access point; that is, either the access point 500 or the access point 501, to which the information processing device 100 is currently communicable. Since the contents of the SSID acquisition processing are the same as the processing contents explained with reference to S460, the explanation thereof is omitted.

In S112, the CPU 106 determines whether an SSID that is the same as the SSID acquired in S108 is stored in the table TB1. When a negative determination is obtained (S112: NO), the CPU 106 proceeds to S116. In S116, the CPU 106 notifies the main thread to the effect that a default device does not exist within the communication area. As an example of when a negative determination is obtained in S112, considered may be a case that the information processing device 100 is outside the communication area from both access points 500 and 501. The CPU 106 thereafter proceeds to S124.

Meanwhile, when a positive determination is obtained in S112 (S112: YES), the CPU 106 proceeds to S120. In S120, the CPU 106 acquires the identifying information of the default device that is associated with an SSID that is the same as the acquired SSID. Specifically, the CPU 106 refers to the storage area storing an SSID that is the same as the acquired SSID in the table TB1 of FIG. 10. In addition, the CPU 106 reads the identifying information 600 of the device in which the default device flag 608 is "ON" from the referenced storage area. The CPU 106 thereafter proceeds to S124.

Meanwhile, in S102, when it is determined that the second wireless communication 152 has been selected (S102: second wireless communication), the CPU 106 proceeds to S104. In S104, the CPU 106 acquires the identifying information of the default device. Specifically, the CPU 106 reads the identifying information 700 of the device in which the default device flag 605 is "ON" in the table TB2 of FIG. 11. The CPU 106 thereafter proceeds to S124.

In S124, the CPU 106 determines whether the purpose to be executed has been selected among the three types of purposes of photo printing 611, web printing 612, and scanning 613. When a positive determination is obtained (S124: YES), the CPU 106 proceeds to S128. In S128, the CPU 106 makes an inquiry to the default device of the selected purpose regarding connectability, model number, and status. The CPU 106 thereafter proceeds to S160 of FIG. 5. Meanwhile, when a negative determination is obtained in S124 (S124: NO), the CPU 106 proceeds to S132. In S132, the CPU 106 makes an inquiry to the respective default devices of all purposes of photo printing 611 to scanning 613 regarding the connectability, model number, and status. The CPU 106 thereafter proceeds to S160 of FIG. 5. Note that, since the processing contents of S128 and S132 are the same as the processing contents of S156 described above, the explanation thereof is omitted.

Subsequently, in S430 of the main thread (refer to FIG. 2), the CPU 106 determines whether a default device exists within the communication area. Specifically, the CPU 106 determines whether the notification of S116 has been output from the connection confirmation thread to the main thread. In S430, when it is determined that a default device does not exist within the communication area, the CPU 106 displays the second preview screen (refer to FIG. 7). Here, information (for example, outside access point area) indicating that a default device does not exist within the communication area may also be displayed in the default device information D2.

Effect of Embodiment 2

According to the print & scan application 121 and the like described in this specification, the information processing device 100 can acquire, from the network, the SSID for identifying the communicable network (S108). In addition, the default device including an SSID that coincides with the acquired SSID can be selected (S120). Consequently, the default device can be selected among the devices that are included in the network that is considered a communication-target by the information processing device 100. Thus, since it is possible to increase the probability of being able to communicate with the default device, the user-friendliness can be improved.

According to the print & scan application 121 and the like described in this specification, when an SSID that coincides with the SSID acquired from the network is not stored in the table TB1 (S112: NO), it is possible to notify the main thread that a default device does not exist within the communication area (S116). In addition, information indicating that a default device does not exist within the communication area can be displayed on the second preview screen. Since it is thereby possible to notify the user that a default device is not included in the network that is considered a communication-target by the information processing device 100, the user-friendliness can be improved.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

MODIFIED EXAMPLES

Figure 4:
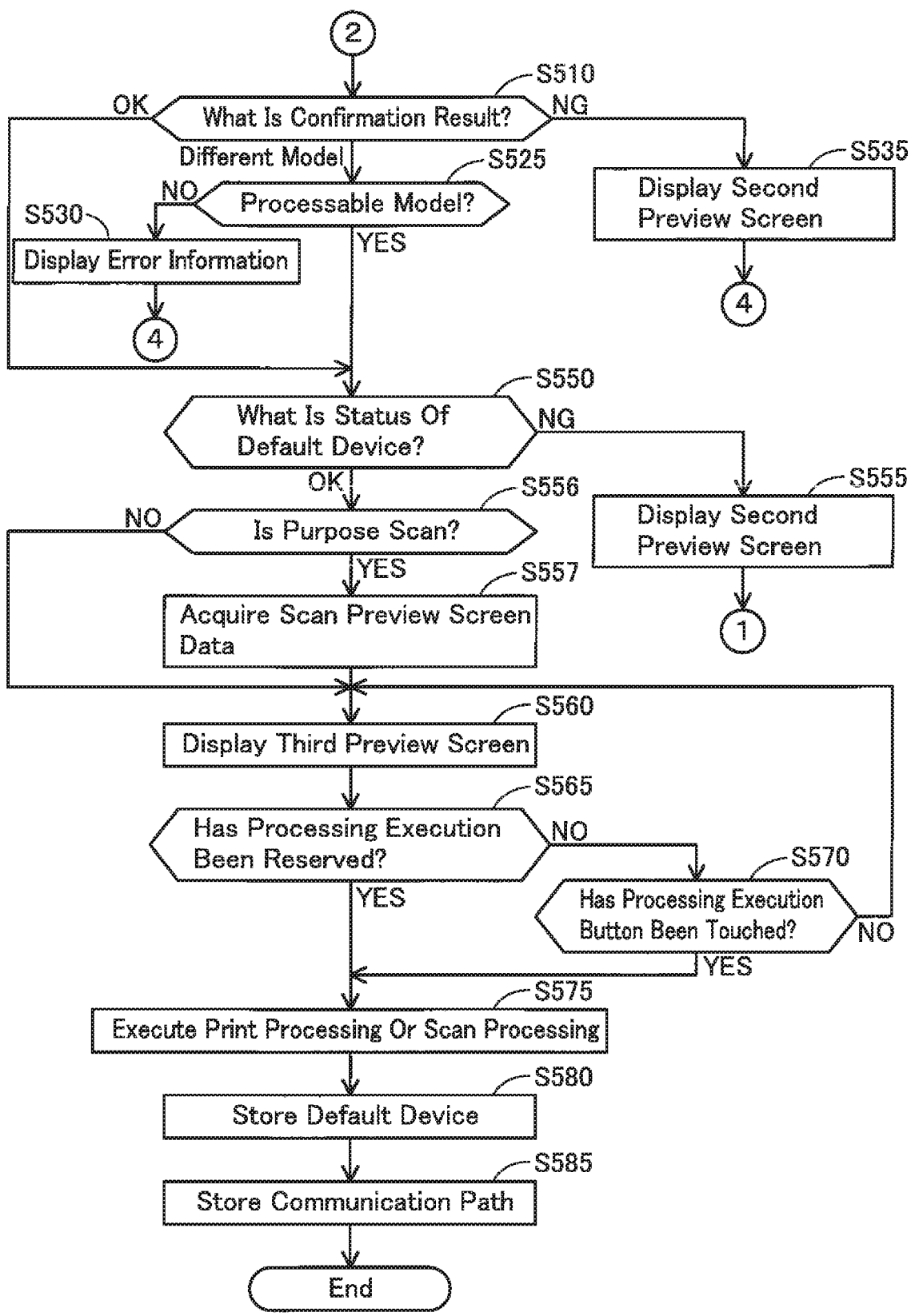
FIG. 4 is a flowchart for explaining an operation example of the main thread.

S525 of FIG. 4 may be omitted. Here, in S510, when it is determined that the model of the default device has been changed (S510: different model), the CPU 106 may proceed to S530. Since it is thereby possible to notify the user that the type of device has been changed such as when the device stored as the default device has been replaced with a new device, the user-friendliness can be improved.

It is also possible to omit the processing of displaying the first preview screen (S440), and proceed from S430 to S442. The processing of accepting the processing execution reservation (S442, S443) may also be omitted. Here, the CPU 106 may proceed from S560 to S570. The error display processing to be performed when the model of the default device has been changed (S525, S530) may also be omitted. The processing of copying the information received from the default device (S170, S171) may also be omitted. From the above, generally speaking, the information processing device 100 may comprise at least a "storing first identifying information", a "executing a connection confirmation process", and a "displaying a reception confirmation image". As a specific example, the information processing device 100 may execute at least S415, S475, S560 and S580.

FIG. 8 shows an example of settings made on the setting screen SR4. Color setting and other settings may also be included.

The method of acquiring the SSID of the access point in S460 may be of various modes. For example, adopted may be a configuration where the user manually inputs the SSID of the access point for enabling the information processing device 100 to communicate. Here, the CPU 106 recognizes the access point of the SSID manually input by the user as the communicable access point.

The devices connected to the information processing device 100 are not limited to the inkjet MFPs 201 to 203, the color laser printer 204, and the scanners 205 and 206 illustrated in FIG. 1. Any type of device may be connected so as long as the device comprises a printing function and a scanning function.

Communication between the access points 500 and 501 and the device may be wireless or wired.

The model number 601 may be of any mode so as long as the devices can be differentiated and, for example, may be configured only of symbols without containing numbers. Moreover, a name such as the device name capable of differentiating the devices may also be used in substitute for the model number.

The information processing device may also be configured to be connectable to an external memory such as an SD card. In addition, adopted may be a configuration of storing various types of data in an external memory in substitute for the storage unit 109.

While the information processing device 100 was explained as an example of the image processing apparatus, the configuration is not limited thereto. The configuration may also adopt a sewing machine that performs stitching or quilting of a predetermined image based on instruction data. The configuration may also adopt a sewing machine that performs decorative stitching or sewing to form work pieces or products based on image data. The configuration may also adopt a 3D printer that generates 3D images via spraying or machining based on instruction data or the like. The configuration may also adopt work piece manufacturing equipment or product manufacturing equipment that forms work pieces or products via spraying or machining based on image data or the like. As an example of image data, 3D image data or 3D CAD data may be used. The configuration may also adopt a scanner that forms image data based on output data from a sensor which optically or electrically detects the profile of an object or based on output data from a sensor that is mounted on the object. The configuration may also adopt a scanner creates data indicating the shape or movement of an object based on the output from a sensor. As an example of image data, moving image data or 3D image data may be used.

Each program may be constituted by a single program module or by a plurality of program modules. Each example may adopt another replaceable configuration which is within the context of the present invention. Adoptable configurations include a computer (the CPU 106 or the like) which executes processing based on a program (the print & scan application 121 or the like), a computer which executes processing based on a program other than an image processing program such as an operating system and other applications, a hardware configuration (the panel 103 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

What is claimed is:

1. A non-transitory computer-readable storage medium storing a print application, the print application being one of applications in an information processing device,
wherein when the print application is executed by a processor of the information processing device in response to the print application being activated by an operating system of the information processing device, the print application causes the information processing device to perform:
acquiring, from a storage unit that is provided in the information processing device and stores the operating system providing basic functions commonly used by applications, first identifying information for identifying a default printing device for the print application, the default printing device being selected from among a plurality of devices in advance as a device to execute printing according to a print execution instruction from the print application, and the first identifying information having been stored in the storage unit before the print application is activated by the operating system;
in response to the print application being activated, executing a connection confirmation process by making an inquiry to the default printing device identified by the first identifying information and confirming whether a communication interface configured to connect with a network has received connection confirmation information sent by the default printing device, the connection confirmation information being a reply to the inquiry, and the execution of the connection confirmation process being triggered by the activation of the print application;
accepting a selection of print data used by the print application via a user interface of the information processing device;
displaying, by the print application and on a display unit of the information processing device, a first preview screen including a preview image and an indication that the connection confirmation process is being executed, wherein the displaying the first preview screen is performed in parallel with the execution of the connection confirmation process and before the connection confirmation information from the default printing device is received by the communication interface, wherein the preview image is for previewing an image that is to be printed by the default printing device by using the selected print data and that is to be printed according to the print execution instruction from the print application, and wherein the default printing device is identified by the first identifying information having been stored in the storage unit before the print application is activated by the operating system;
after the displaying the first preview screen and while the connection confirmation process is being executed in parallel, receiving the print execution instruction via the user interface and setting a processing execution reservation flag;
in response to determining, via the connection confirmation process, that the communication interface has received the connection confirmation information sent by the default printing device, displaying, by the print application and on the display unit of the information processing device, a second preview screen including the preview image and a confirmation image indicating that a connection between the print application and the default printing device has been confirmed; and
when it is determined that the processing execution reservation flag has been set and the default printing device has not been selected via the user interface after the second preview screen has been displayed, sending the print execution instruction to the default printing device via the communication interface.

2. The non-transitory computer-readable storage medium according to claim 1, wherein the storing includes:
storing, in the storage unit, the first identifying information of each of the plurality of devices in association with each of a plurality of purposes, and
in a case that an operating unit of the information processing device has accepted a purpose designation operation for designating one purpose prior to starting the connection confirmation process, the executing of the connection confirmation process includes:
selecting a communication destination device based on the first identifying information associated with the one purpose designated by the purpose designation operation, and
executing the connection confirmation process with the selected communication destination device.

3. The non-transitory computer-readable storage medium according to claim 2, wherein
in a case that a process corresponding to the one purpose designated by the purpose designation operation is executed, the print application further causes the processor to perform: storing a first purpose indicating the one purpose in the storage unit, and
in a case that the operating unit has not accepted the purpose designation operation after having stored the first purpose in the storage unit, the executing of the connection confirmation process includes:
selecting a first communication destination device based on the first identifying information associated with the first purpose; and
executing the connection confirmation process with the selected first communication destination device.

4. The non-transitory computer-readable storage medium according to claim 3, wherein
the first identifying information includes first type specifying information indicating a type of the communication destination device,
the connection confirmation process includes a process of acquiring, from a specified communication destination device via the communication interface, second type specifying information indicating a type of the specified communication destination device which is the communication destination device specified by the first identifying information,
the print application further causes the processor to perform: executing a preview display process for displaying a preview image on a display unit of the information processing device after the connection confirmation process is started in the executing of the connection confirmation process, the preview image being an image for previewing an image generated in a process including communication with the communication destination device, and
the executing of the preview display process includes: displaying, on the display unit, second error information indicating that the type of the communication destination device identified by the first identifying information is different from the type of the specified communication destination device, in a first case that the first type specifying information included in the first identifying information and the second type specifying information acquired from the specified communication destination device do not coincide.

5. The non-transitory computer-readable storage medium according to claim 4, wherein
the connection confirmation information is image information for use in print processing or scan processing, and
the executing of the preview display process includes:
displaying, on the display unit, the second error information on condition that the specified communication destination device cannot process the image information in the first case.

6. The non-transitory computer-readable storage medium according to claim 2, wherein
the executing of the connection confirmation process includes:
selecting the communication destination device based on the first identifying information associated with the one purpose designated by the purpose designation operation;
executing the connection confirmation process with the selected communication destination device; and storing, in the storage unit, confirmation result information obtained in the connection confirmation process, the confirmation result information being stored in association with the communication destination device, and
in a case that another device identified by the first identifying information associated with another purpose other than the one purpose is a device that is the same as the communication destination device, the executing of the connection confirmation process includes storing, in the storage unit, the confirmation result information in association with the another device.

7. The non-transitory computer-readable storage medium according to claim 2, wherein
the information processing device is configured to:
select a communication-target network among a plurality of networks; and
communicate with the selected communication destination device among a plurality of devices included in the communication-target network,
the first identifying information includes second identifying information for identifying a network to which a plurality of devices being candidates of the communication destination device belongs, and
the executing of the connection confirmation process includes:
acquiring the second identifying information for identifying the communication-target network from the communication-target network via the communication interface, and
selecting the communication destination device based on the first identifying information including second identifying information that coincides with the acquired second identifying information.

8. The non-transitory computer-readable storage medium according to claim 7, wherein the print application further causes the processor to perform: displaying first error information on the display unit, the first error information indicating that the first identifying information corresponding to the communication destination device is not stored, in a case that the first identifying information including the second identifying information that coincides with the second identifying information acquired from the communication-target network is not stored in the storage unit.

9. The non-transitory computer-readable storage medium according to claim 1, wherein
the communication interface comprises:
a first communication interface for constructing, via an access point, a first network for communicating with at least one of the plurality of devices; and
a second communication interface for constructing, without an access point, a second network for communicating with at least one of the plurality of devices, wherein the information processing device is configured to:
select a communication-target network from either the first network or the second network; and
communicate with a selected communication destination device among a plurality of devices included in the communication-target network.

10. The non-transitory computer-readable storage medium according to claim 1, wherein the displaying of the preview image includes displaying the preview image on a display unit of the information processing device after the connection confirmation process is started in the executing of the connection confirmation process, wherein the displaying of the preview image is executable in parallel with the connection confirmation process, and wherein, in a case that an operating unit of the information processing device accepts a preview display operation of executing the displaying of the preview image, the displaying of the preview image includes:

displaying, on the display unit, the preview image including processing status information showing that the connection confirmation process is being executed in a case that the connection confirmation process is in execution; and displaying, on the display unit, the preview image including information indicating contents of a processing result of the connection confirmation process in a case that the connection confirmation process has been completed.

11. The non-transitory computer-readable storage medium according to claim 10, wherein the print application further causes the processor to perform:

executing a selection acceptance screen display process of:
displaying a selection acceptance screen on the display unit; and
accepting a selection of a communication destination device, and
when the operating unit of the information processing device accepts a user operation for executing the selection acceptance screen display process in a period during which the processing status information is being displayed, the executing of the selection acceptance screen display process includes:
ending the connection confirmation process; and
displaying, on the display unit, the selection acceptance screen including a device status information indicating that the communication destination device has not yet been selected.

12. The non-transitory computer-readable storage medium according to claim 11, wherein the storing comprises storing new first identifying information in the storage unit in substitution for old first identifying information that had been stored, the new first identifying information being stored in accordance with the acceptance of the selection of the communication destination device in the selection acceptance screen display process, and wherein the new first identifying information is for identifying the communication destination device, for which selection was accepted in the executing of the selection acceptance screen display process.

13. The non-transitory computer-readable storage medium according to claim 10, wherein the print application further causes the processor to perform:

displaying, on the display unit, a screen including device status information indicating that a communication destination device has not yet been selected, in a case that it has been confirmed that, based on the connection confirmation process, a communication with the communication destination device cannot be made, in which case an operating unit of the information processing device accepted a preview display user operation for executing the displaying of the preview image.

14. The non-transitory computer-readable storage medium according to claim 10, wherein the displaying of the preview image includes displaying, on the display unit, information indicating a communication destination device together with the preview image, when the connection confirmation process is completed.

15. The non-transitory computer-readable storage medium according to claim 1, wherein the print application further causes the processor to perform:

executing an activation status screen display process of displaying, on the display unit, an activation status screen indicating that the print application is being activated, when the print application is activated by the information processing device, wherein the activation status screen display process is executable in parallel with the connection confirmation process, and wherein the activation status screen display process is started before the connection confirmation process is started.

16. The non-transitory computer-readable storage medium according to claim 1, wherein:

the activation of the print application is executable in parallel with the connection confirmation process, and
a processing time required for the activation of the print application is used as a processing time of the connection confirmation process.

17. An information processing device configured to communicate with a communication destination device which is selected as a communication target among a plurality of devices, the information processing device comprising:

a communication interface configured to connect with a network;
a processor coupled to the communication interface;
a display unit;
a storage unit storing an operating system and a print application; and
a user interface,
wherein the operating system is configured to provide basic functions commonly used by applications,
wherein the print application is one of the applications in the information processing device, and
wherein when the print application is executed by the processor in response to the print application being activated by the operating system, the print application causes the information processing device to perform:
acquiring, from the storage unit of the information processing device, first identifying information for identifying a default printing device for the print application, the default printing device being selected from among the plurality of devices in advance as a device to execute printing according to a print execution instruction from the print application, and the first identifying information having been stored in the storage unit before the print application is activated by the operating system;
in response to the print application being activated, executing a connection confirmation process by making an inquiry to the default printing device identified by the first identifying information and confirming whether the communication interface has received connection confirmation information sent by the default printing device, the connection confirmation information being a reply to the inquiry, and the execution of the connection confirmation process being triggered by the activation of the print application;
accepting a selection of print data used by the print application via the user interface of the information processing device;
displaying, by the print application and on the display unit of the information processing device, a first preview screen including a preview image and an indication that the connection confirmation process is being executed, wherein the displaying the first preview screen is performed in parallel with the execution of the connection confirmation process and before the connection confirmation information from the default printing device is received by the communication interface, wherein the preview image is for previewing an image that is to be printed by the default printing device by using the selected print data and that is to be printed according to the print execution instruction from the print application, and wherein the default printing device is identified by the first identifying information having been stored in the storage unit before the print application is activated by the operating system;

after the displaying the first preview screen and while the connection confirmation process is being executed in parallel, receiving the print execution instruction via the user interface and setting a processing execution reservation flag;

in response to determining, via the connection confirmation process, that the communication interface has received the connection confirmation information sent by the default printing device, displaying, by the print application and on the display unit of the information processing device, a second preview screen including the preview image and a confirmation image indicating that a connection between the print application and the default printing device has been confirmed; and when it is determined that the processing execution reservation flag has been set and the default printing device has not been selected via the user interface after the second preview screen has been displayed, sending the print execution instruction to the default printing device via the communication interface.

18. The information processing device according to claim 17, wherein:
the activation of the print application is executable in parallel with the connection confirmation process, and
a processing time required for the activation of the print application is used as a processing time of the connection confirmation process.

19. A method for controlling an information processing device configured to communicate with a communication destination device which is selected as a communication target among a plurality of devices,
the information processing device comprising:
a communication interface configured to connect with a network;
a processor coupled to the communication interface;
a display unit;
a storage unit storing an operating system and a print application; and
a user interface,
the operating system providing basic functions commonly used by applications,
the print application is one of the applications in the information processing device, and
wherein when the print application is executed by the processor in response to the print application being activated by the operating system, the print application causes the information processing device to perform the method, and
the method comprising:
acquiring, from the storage unit of the information processing device, first identifying information for identifying a default printing device for the print application, the default printing device being selected from among the plurality of devices in advance as a device to execute printing according to a print execution instruction from the print application, and the first identifying information having been stored in the storage unit before the print application is activated by the operating system;

in response to the print application being activated, executing a connection confirmation process by making an inquiry to the default printing device identified by the first identifying information and confirming whether the communication interface has received connection confirmation information sent by the default printing device, the connection confirmation information being a reply to the inquiry, and the execution of the print application;

accepting a selection of print data used by the print application via the user interface of the information processing device;

displaying, by the print application and on the display unit of the information processing device, a first preview screen including a preview image and an indication that the connection confirmation process is being executed, wherein the displaying the first preview screen is performed in parallel with the execution of the connection confirmation process and before the connection confirmation information from the default printing device is received by the communication interface, wherein the preview image is for previewing an image that is to be printed by the default printing device by using the selected print data and that is to be printed according to the print execution instruction from the print application, and wherein the default printing device is identified by the first identifying information having been stored in the storage unit before the print application is activated by the operating system;

after the displaying the first preview screen and while the connection confirmation process is being executed in parallel, receiving the print execution instruction via the user interface and setting a processing execution reservation flag;

in response to determining, via the connection confirmation process, that the communication interface has received the connection confirmation information sent by the default printing device, displaying, by the print application and on the display unit of the information processing device, a second preview screen including the preview image and a confirmation image indicating that a connection between the print application and the default printing device has been confirmed; and when it is determined that the processing execution reservation flag has been set and the default printing device has not been selected via the user interface after the second preview screen has been displayed, sending the print execution instruction to the default printing device via the communication interface.

20. The method according to claim 19, wherein:
the activation of the print application is executable in parallel with the connection confirmation process, and
a processing time required for the activation of the print application is used as a processing time of the connection confirmation process.

* * * * *